US012032157B2

(12) United States Patent
Stark et al.

(10) Patent No.: US 12,032,157 B2
(45) Date of Patent: Jul. 9, 2024

(54) HEADSET DYNAMIC WINDOWING

(71) Applicant: VOYETRA TURTLE BEACH, INC., White Plains, NY (US)

(72) Inventors: Juergen Stark, San Diego, CA (US); Michael Stark, San Diego, CA (US)

(73) Assignee: Voyetra Turtle Beach, Inc., White Plains, NY (US)

( * ) Notice: Subject to any disclaimer, the term of this patent is extended or adjusted under 35 U.S.C. 154(b) by 0 days.

(21) Appl. No.: 18/126,549

(22) Filed: Mar. 27, 2023

(65) Prior Publication Data

US 2023/0324681 A1      Oct. 12, 2023

Related U.S. Application Data

(63) Continuation of application No. 17/839,545, filed on Jun. 14, 2022, now Pat. No. 11,614,619, which is a continuation of application No. 17/717,417, filed on Apr. 11, 2022, now abandoned.

(51) Int. Cl.
*G02B 27/00* (2006.01)
*G02B 27/01* (2006.01)

(52) U.S. Cl.
CPC ..... *G02B 27/0093* (2013.01); *G02B 27/0179* (2013.01); *G02B 2027/0187* (2013.01)

(58) Field of Classification Search
CPC ............ G02B 27/0093; G02B 27/0179; G02B 2027/0187
See application file for complete search history.

(56) References Cited

U.S. PATENT DOCUMENTS

| | | | |
|---|---|---|---|
| 4,811,245 A | 3/1989 | Bunker | |
| 9,489,045 B2 | 11/2016 | Larson | |
| 10,176,636 B1* | 1/2019 | Neustein | A41D 27/085 |
| 10,401,948 B2* | 9/2019 | Ooi | G06F 3/017 |
| 10,705,643 B2 | 7/2020 | Rosenberg | |
| 11,614,619 B1* | 3/2023 | Stark | G06F 3/011 |
| | | | 345/156 |
| 2007/0070066 A1* | 3/2007 | Bakhash | G06F 3/04845 |
| | | | 345/419 |
| 2012/0147038 A1 | 6/2012 | Perez | |
| 2014/0063060 A1* | 3/2014 | Maciocci | G06F 3/011 |
| | | | 345/633 |
| 2014/0343404 A1* | 11/2014 | Razzaque | A61B 8/0841 |
| | | | 600/424 |
| 2015/0356774 A1 | 12/2015 | Gal | |

(Continued)

FOREIGN PATENT DOCUMENTS

| CN | 113035010 A | 6/2021 |
|---|---|---|
| CN | 113552947 A | 10/2021 |

(Continued)

*Primary Examiner* — Dmitriy Bolotin
(74) *Attorney, Agent, or Firm* — Sheppard Mullin Richter & Hampton LLP

(57) ABSTRACT

Systems and methods for headset windowing may include determining a geometry of a first object used with a computing system in a work space; determining, based on information received from a sensor, when the user wearing a VR headset tilts their head to bring the first object into view of the VR headset; and displaying a first window on a display of the VR headset, the first window being dimensioned to conform to the geometry of the first object in view of the headset.

20 Claims, 7 Drawing Sheets

(56) References Cited

U.S. PATENT DOCUMENTS

| | | |
|---|---|---|
| 2016/0247319 A1 | 8/2016 | Nowatzyk |
| 2018/0088682 A1 | 3/2018 | Tsang |
| 2020/0301553 A1 | 9/2020 | Taylor |
| 2020/0391116 A1 | 12/2020 | Osman |
| 2021/0096726 A1 | 4/2021 | Faulkner |
| 2021/0132683 A1* | 5/2021 | Herling .............. G02B 27/0093 |
| 2022/0193562 A1 | 6/2022 | Kawashima |

FOREIGN PATENT DOCUMENTS

| | | |
|---|---|---|
| DE | 102020111010 A1 | 10/2021 |
| EP | 3067874 A1 | 9/2016 |
| KR | 102188313 B1 | 12/2020 |
| TW | 202110173 A | 3/2021 |

\* cited by examiner

HEADSET DYNAMIC WINDOWING

CROSS-REFERENCE TO RELATED APPLICATION

This application is a continuation of U.S. patent application Ser. No. 17/839,545, filed Jun. 14, 2022, entitled "HEADSET DYNAMIC WINDOWING", which is a continuation of U.S. patent application Ser. No. 17/717,417, filed Apr. 11, 2022 (abandoned), entitled "HEADSET DYNAMIC WINDOWING", which is hereby incorporated herein by reference in its entirety.

TECHNICAL FIELD

The disclosed technology relates generally to virtual reality headsets, and more particularly, some embodiments relate to a virtual reality headset having a dynamic windowing capability.

DESCRIPTION OF THE RELATED ART

Virtual reality (VR) headsets, also called VR goggles, have gained enormous popularity over the last several years. They have become widely accepted in commercial, military, medical and consumer applications. VR headsets are widely used, for example, in videogames, simulators, trainers and other applications. VR headsets can be used for both VR and augmented reality (AR) applications, as well as for other headset/goggle applications. However, for ease of description the term VR headsets is used in this document.

VR headsets are typically worn by the user over the user's head like a pair of goggles. Inside the front panel of the headset, facing the user's eyes, is one or more display screens. VR headsets allow stereoscopic or other images to be displayed on the one or more displays within the headset. However, because the VR headset is intended to show content to the user on the displays, the VR headset typically partially, if not fully, obstructs the user's view of the user's actual (non-headset) environment. Some VR headsets, such as in AR applications, combine the surrounding (non-headset) view with an overlaid view using various types of clear displays or other mechanisms to insert and overlay the real-life view the user is seeing with the desired graphics or overlaid view.

BRIEF SUMMARY OF EMBODIMENTS

According to various embodiments of the disclosed technology a virtual reality (VR) headset, which may include a headset presenting augmented reality (AR) or other content or other headset, is provided with a dynamic windowing capability. The dynamic windowing capability allows the headset to provide an object window on the headset display within which the headset displays real-world objects in the user environment, such as, e.g., a keyboard, tablet, or other peripheral, device or other object to the user. Thus, the VR headset uses imaging devices (e.g., one or more cameras) to capture images of the real-world objects in the user environment, creates an object window do display such an object and displays the object within the object window. When the user tilts their head down, for example to look at the object (e.g., peripheral), the object is presented in the window on the headset display.

Embodiments may be implemented in which the windowing is dynamic. That is, the headset (or its associated app) may learn, receive, obtain, be programmed with or otherwise determine the placement, shape and size of the peripheral device or other objects in the user environment. Thus, when the user turns their head (e.g., looks down at the desktop) a customized window appears to show the object (e.g., peripheral or other object) on the headset display. Because the headset (or its app) knows or can determine the size and shape of the relevant object, the window can be tailored to fit the object without consuming additional space on the headset display. This allows the VR headset to maximize the active display area (e.g., for gaming, simulation, work or other purposes) while still showing all, or relevant portions of, the object to be viewed by the user in the object window.

Additionally, the object window can be generated to appear at a fixed position on the display, or it can be configured to be selectively positioned by the user. In further embodiments it can be configured to move about the VR display depending on head orientation (e.g., as the user tilts/turns their head to look toward or away from an object). These positioning parameters can be configured automatically by the system based on current circumstances (e.g., the instant application or task being performed), or they can be configured based on user or preset settings.

Various embodiments represent an improvement over conventional technology, which just provides a simple, static window for displaying a peripheral. These conventional static windows don't know the shape and size of objects to be viewed by the user and accordingly do not provide a tailored picture-in-picture display. Such conventional windowing technologies may waste space on the display because the window isn't tailored in size or in shape. Such conventional windows may also be statically positioned as well.

In various embodiments, the dynamic object window can be sized by the user such that the object to be viewed is displayed to a desired scale within the headset display.

According to an embodiment of the disclosed technology A method for headset windowing, includes: determining a geometry of a first object used with a computing system in a work space; determining, based on information received from a sensor, when the user wearing a VR headset tilts their head to bring the first object into view of the VR headset; and displaying a first window on a display of the VR headset, the first window being dimensioned to conform to the geometry of the first object in view of the headset.

Determining when the user wearing a VR headset tilts their head to bring the first object into view of the VR headset may include receiving image information from a camera of the VR headset and analyzing the image information to determine whether all or a portion of the first object is being captured by the image sensor.

Determining when the user wearing a VR headset tilts their head to bring the first object into view of the VR headset may include receiving image information from a position sensor of the VR headset to determine the user's head orientation, and determining whether the first object is in view of the VR headset based on the user's head orientation and a position of the first object in the workspace.

Displaying the first window on a display of the VR headset may include displaying the first window at a predetermined position on the display of the VR headset.

Displaying the first window on a display of the VR headset may include displaying the first window at a position on the display of the VR headset determined based on the degree to which the user tilts their head.

Displaying the first window on a display of the VR headset may include displaying the first window at a position on the display of the VR headset determined based on the degree to which the user tilts their head.

Embodiments may further include sweeping the first window on the display of the VR headset based on the user's movement of their head relative to the first object.

Displaying the first window on a display of the VR headset may include displaying only a portion of the first window on the display of the VR headset based on the degree to which the user tilts their head.

Displaying the first window on a display of the VR headset may include only displaying the first window on the display of the VR headset based on detecting presence of the user's hand or hands over the first object.

The Embodiments may further include determining, based on information received from a sensor, when the user wearing a VR headset tilts their head to bring a second object into view of the VR headset; and displaying a second window on the display of the VR headset, the second window being dimensioned to conform to the geometry of the second object in view of the headset. The second window may be displayed at least partially simultaneously with the first window.

Embodiments may be performed using a processor and a memory coupled to the processor to store instructions, which when executed by the processor, cause the processor to perform operations. The processor and memory may include multiple processors and memories.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
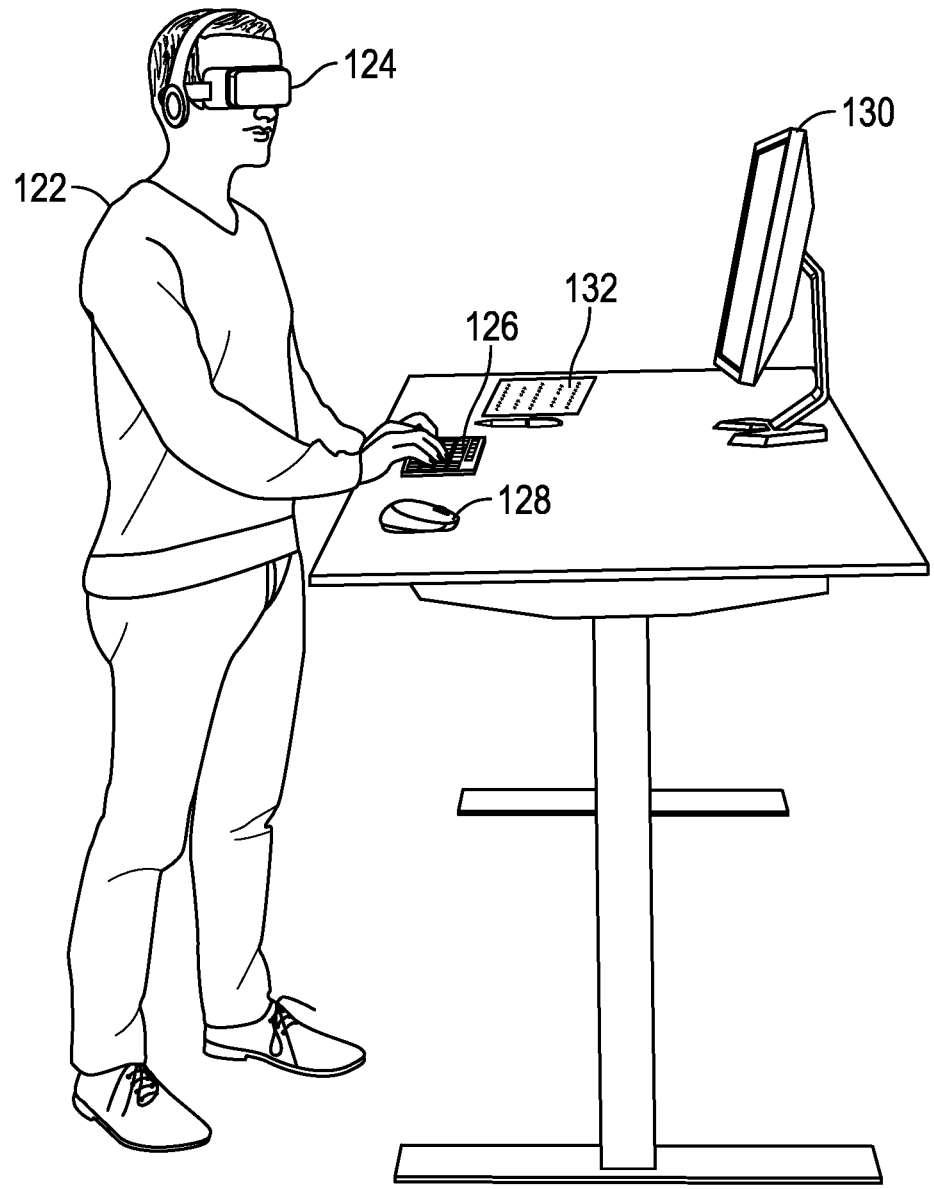
FIG. 1 illustrates an example computing environment with which various embodiments may be implemented.

The figures are not exhaustive and do not limit the disclosure or the disclosed embodiments to the precise form disclosed.

DETAILED DESCRIPTION OF THE EMBODIMENTS

Embodiments of the technology disclosed herein are directed toward devices and methods for providing a dynamic windowing display for a virtual reality (VR) headset. The dynamic windowing capability may be implemented to allow the headset to provide a custom, dynamic window on the headset display to display a keyboard, joystick, mouse, tablet, or other peripheral or device to the user when the user is wearing the VR headset. The VR headset may include a position sensor. This may include one or more position sensors, motion sensors, accelerometers, image sensors or other sensors to detect head position and movement. Knowing the position of the relevant object (e.g., keyboard, display, etc.) or by using image processing techniques, information from the VR headset sensors may be used to determine whether the user tilted their head to look at the device (e.g., up/down/left/right). If so, a window in which the object (e.g., peripheral) is shown can be presented on the headset display.

Embodiments may be implemented in which the windowing is dynamic. That is, the dynamic windowing system may learn, receive, obtain, know be programmed with or otherwise determine the placement, shape and size of the peripheral devices or other objects currently in the environment. Thus, the object window used to display the relevant object (e.g., keyboard, mouse, joystick, trackball, or other peripheral or object) need not be a fixed rectangular shape, but instead can be of a shape that conforms to the outlines of the object being displayed. For example, a keyboard with rounded corners may be displayed in an elongated window with rounded corners. As another example, an ergonomic keyboard may generally have an overall arcuate shape, curving "upward" from each end. The object window can accordingly be shaped in this configuration to conform to the outlines of the keyboard, rather than presenting a more rectangular window. As yet another example, a joystick may be displayed in an object window shaped in accordance with the outline of the joystick in the line of vision of the user. Because the headset knows the shape of the relevant peripheral, the window can be tailored to fit the peripheral without consuming additional space on the headset display. This allows the VR headset to maximize the active display area (e.g., for gaming, work or other purposes) while still showing all, or a relevant portion of, the object in the user's environment.

One or more image sensors (e.g., cameras) can be included on the outside of the VR headset facing in the direction of the user's line of sight. When the user tilts their head to look at a peripheral or other object in their environment, the camera or cameras can be engaged and provide a real-time live image of an object in the object window on the headset display. In this manner, the user can see their keystrokes or other actions or movements while interacting with the relevant device. Thus the user will know if they are hitting the correct keys or buttons, writing on the lines of the notepad, or otherwise properly manipulating the peripheral or other object. In the case of a notepad or display, the user will be able to see the notepad or display in the object window. Speakers or other audio emitters can also be included with the VR headset to provide sound to the user. These can be provided in various forms, including in the form of headphones or earbuds, for example.

The dynamic windowing system can be configured such that the object window automatically turns on or off depending on whether the user is "looking at" an object in their environment. For example, when the user tilts their head to look at a real-world object in their environment such as a keyboard, the object window can turn on automatically and display the keyboard, e.g., in a picture-in-picture-like fashion. Likewise, when the user looks away from the object the object window can be shut off automatically so as to maximize the active viewing area of the VR headset. Thus, the headset may be configured to allow the user to see what they want to see when they want to see it without additional manual input from the user. Other embodiments may require a manual enabling/disabling of the window, and can use gesture control as described herein.

In some embodiments, the real-world object can slide into and out of view as the user tilts their head toward and away from the object, and it can be partially displayed to reflect a situation in which the user's head is only tilted part way toward the object. This way, instead of turning on and off as a whole window, the object window can slide up the screen into view, for example, as the user tilts their head down, or can slide in and out from and in other directions (e.g., as the user sweeps their head left/right/up/down to "look at" objects.

The system can also be configured to selectively activate the window when the user looks at the object based on the user's actions at the time. For example, if the user is looking down and their hands are active on the keyboard, the system may activate the keyboard window. On the other hand, if the user glances down but does not appear to be using the keyboard, the system may forgo activating the keyboard window until the user places their hands over the keyboard. Image information from the VR headset image sensors can be processed to determine whether the user is looking at the peripheral and whether the user is actively using the peripheral at the time (e.g., such as by hand placement, hand movement, etc.). As another example, a microphone can be used to detect keyboard clicks to determine whether to activate the object window.

The dynamic windowing system can be configured to accommodate multiple peripherals and other objects within the user's environment (e.g., the gaming space or workspace). As with the example described above, the system can be configured to know the position and shape of the various peripherals or other objects in the workplace. Accordingly, when the user tilts their head in a particular direction or a particular angle, the headset can determine which object (if any) the user is "looking at," and display the appropriate window with that object. If the user is "looking at" multiple objects at the same time, multiple windows may be displayed on the VR display (e.g., one per object). The system may be configured to use the cameras and image analysis to determine whether the user is actively using all of the peripherals in view. Based on this information, the system may determine to display a window or windows only for the object or objects actively being used. The system may continue to monitor activity in real time and turn on or turn off the display for one or more objects based on their then-current usage.

The dynamic windowing system functionality described herein may be provided within the headset itself, such as within a processor and memory of the headset. In alternative embodiments, the dynamic windowing system functionality described herein may be provided within the computing system with which the headset is operating (e.g., within an application running on a gaming system, workstation or other computing device). In yet further embodiments, the dynamic windowing system functionality can be provided in the cloud. In still further embodiments, the functionality can be provided across at least one of the headset, the associated computing system, the cloud or some other computing environment.

Before describing example embodiments in detail, it is useful to describe an example environment with which various embodiments may be implemented. FIG. 1 illustrates an example computing environment with which various embodiments may be implemented. This example environment could be any of a number of different computing environments such as, for example, a work station or work environment, a gaming environment, a shopping or other commercial kiosk, a medical or other health-care environment, or any of a number of other environments. This example computing environment is included herein merely to provide contextual background for the description that follows. After reading this description, it will be apparent how embodiments of the technology disclosed herein may be implemented in this or any of a number of other environments in which a VR headset may be utilized.

As seen in this example, a user 122 is positioned in front of a desk or other worktable. The user is wearing a VR headset 124, which may be used to display VR, AR, other content, or a combination of the foregoing. The VR headset 124 may be used for a variety of applications including, for example, gaming, industrial, commercial, medical and consumer applications. It can display simulated environments or actual real-world events. It can provide a display to the user of views captured by cameras on the headset or cameras on peripheral devices such as, for example, tools and instruments, including surgical/medical devices, industrial tools and so on. VR headset 124 can be used for VR, AR, VR/AR and other display operations.

This example computing environment includes a keyboard 126 and mouse 128 connected to a computer 130. The environment also includes a notepad 132, such as a paper notepad or electronic tablet. Although not illustrated, additional peripherals or other objects, such as, for example, joysticks, trackballs, touchpads, or other UI devices may be included in the environment, as may smart phones, tablets, PDAs, computer monitors or other objects. Additionally, non-electronic objects may be present as well such as notepads, hard copy diagrams, documentation or other items. For clarity of description and ease of discussion, the term peripherals is used herein to describe peripherals and other objects that may be connected to or otherwise included in the computing environment.

Functioning in this example environment, the user may wish to look at one of the objects, such as his or her keyboard 126 or mouse 128. Because user 122 is wearing VR display 124, the user cannot actually "see" the keyboard 126, mouse 128 or notepad 132 with the naked eye when the user tilts their head down. Accordingly, one or more cameras at the front of VR headset 124 may be configured to capture a live image of the keyboard 126, mouse 128 and notepad 132, as well as keystrokes or other movements of user 122 as they operate the peripherals or write on notepad 132. The system may detect that the user is looking at one or more of the peripherals, such as based on direction of gaze (e.g., head tilt and pupil pointing) or based on image processing.

As noted above, the object or objects could be displayed in one or more object windows, shaped to match the keyboard or mouse shape and be displayed at a desired location on the display of the VR headset. For example, the keyboard display window may be located at the bottom of the VR headset display if the keyboard is positioned in front of and below the user's line of sight when looking straight ahead. As another example, the mouse window may be displayed in the lower right-hand corner of the display, such as for a right-handed user who keeps their mouse to the right of the keyboard. As yet another example, the notepad window may be displayed toward the lower left of the display based on the position of notepad 132 in the example environment. As still a further example, a computer-display window can be provided more centrally in the display to reflect the position of the computer screen of computer 130.

In various embodiments, the object window can be configured to move about across the display. For example, it can be configured to move left, right, up, down and diagonally. This might be done as the user tilts their head left/right/up/down to reflect such movement. For example, as the user looks farther down or tilts their head back up, the window can move farther up or farther down on the screen in accordance with such movement. Similarly, embodiments may be implemented such that when the user tilts their head left or right the window can slide across the display in the corresponding direction. This may allow the user to, for example, look up past the object or to the side of the object or to otherwise adjust their head angle and position to position the object window in a noncritical area of the display. In other embodiments, the object window can be provided at a fixed location on the display. These features can, in some embodiments, be user selected such that the user can enable/disable the sliding features.

In further embodiments, the fixed location of a window may be set in a predetermined position by the user, such as by a settings menu or by hotkeys, by gesture control or by other user interface actuation. The system can be configured such that the object-window position can be set in advance or set while the user is operating the computing environment. In further embodiments, a hybrid approach may be implemented in which object windows can be fixed or movable. The system can be configured to switch between fixed and movable based on, for example, user input, user settings, system settings or contextual information.

Figure 2:
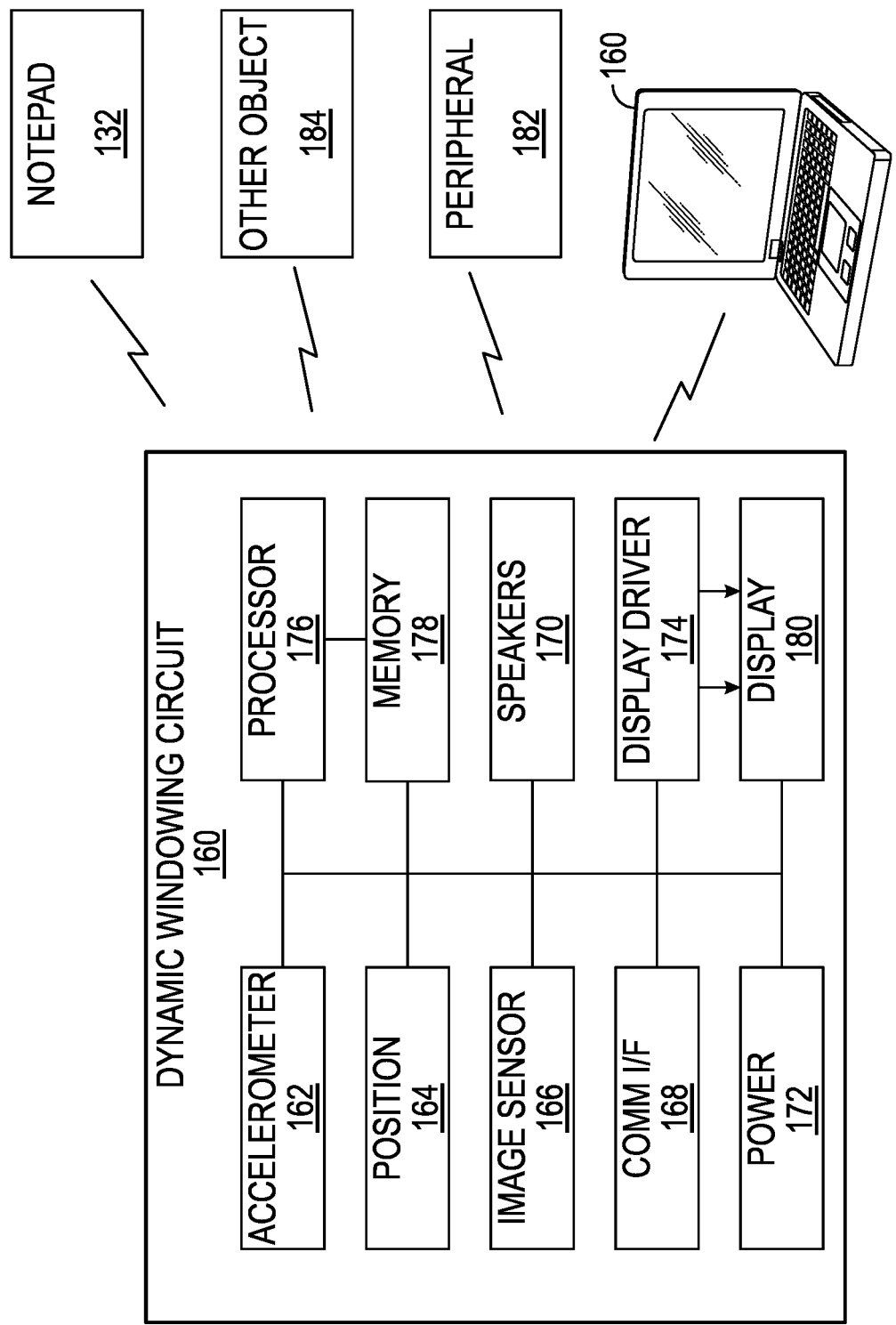
FIG. 2 is a diagram illustrating an example architecture for a VR headset with dynamic windowing capabilities in accordance with various embodiments.

FIG. 2 is a diagram illustrating an example architecture for a dynamic windowing circuit in accordance with various embodiments. Referring now to FIG. 2, an example dynamic windowing circuit 160 is shown as being communicatively coupled with a computing device 160, a peripheral 182 and another object 184. This communication can be wired or wireless. The example includes an accelerometer 162, a position sensor 164, an image sensor 166, speakers 170, a communications interface 168, a processor 176, memory 178, a display driver 174, a power supply 172 and a display 180.

Processor 176 can include one or more GPUs, CPUs, microprocessors, or any other suitable processing system. Processor 176 may include one or more single core or multicore processors. The memory 178 may include one or more various forms of memory or data storage (e.g., flash, RAM, etc.) that may be used to store the, instructions and variables for processor 176 as well as any other suitable information. Other suitable information may include, for example, information about the peripherals and devices in the work area. This can include information, such as, device identification, device boundaries, device location, and so on.

Memory 178, can be made up of one or more modules of one or more different types of memory, and may be configured to store data and other information as well as operational instructions that may be used by the processor 176.

In various applications, the processor may include multiple different forms of processor such as, for example, a control logic, and an application processor. Processor 176 can include interfaces to receive information from the various sensors, such as by a sensor hub. Processor 176 may also be configured to receive information from the communications interface 168 (described below).

Although the example of FIG. 2 is illustrated using processor and memory circuitry, as described below with reference to circuits disclosed herein, the VR headset, including the dynamic windowing circuit aspects thereof can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a dynamic windowing circuit.

This example includes an accelerometer 162 and position sensor 164 to capture information pertaining to movement and position of the user's head. This captured information can be sent to processor 176 to determine movement and position of the user's head as they tilt or twist their head or move around in the environment (e.g., head position, change in position, head orientation, change in orientation, and so on). This information can be used, for example, to determine whether the user has tilted their head (e.g., up/down/left/right), or whether their head is oriented in a particular position, such that the user is looking at an object. This information can further be used to determine which object or objects the user is looking at in environments that include multiple devices.

Image sensors 166 may be included and used to capture images of the user's real-world environment. Captured image information can be used by the dynamic windowing circuit 162 determine whether the user is "looking at" one or more objects in the environment, and to capture images of these objects for later use or for real-time use. In operation, images of objects captured can be passed through in a dynamic object window to display the object to the user.

The various sensors included with the dynamic windowing circuit 160 can also capture and provide information that can be used to track movement of the user's limbs or other body parts, such as the users arms, hands, feet legs, etc. Sensors may also be included to track the movement and position of objects, such as, for example, gloves, wands, markers and peripherals. In various embodiments, additional or other sensors may also be provided.

Communications interface 168 may be a wired or wireless communications interface providing one-way or two-way communication between the dynamic windowing circuit and other devices. This can include, for example, communications with computing device 160, peripheral 182, other object 184 and Notepad 132 (in the case where notepad 132 is a tablet or other like "pad" with communication capabilities). This may also include, as another example, communications with the aforementioned cameras used to capture the user's field of view. Examples of a communications interface 168 may include serial, parallel, universal serial bus (USB), FireWire, Ethernet, fiber optic, co-axial, and twisted pair cables. A wireless communications interface may include, for example, WiFi, Bluetooth®, NFC, or other short range communications protocols. Communications interface 168 may include a combination of the foregoing.

Communications interface 168 may be provide communications with the relevant computing system such as to receive video signals from the computing system for display on the headset display. Data transferred via communications interface 168 may be in the form of signals which may be electronic, electromagnetic, optical or other signals capable of being transmitted and received by communications interface.

Power supply 172 may include various types of power supplies, such as, for example, a batteries, solar photovoltaic cells, rechargeable batteries and charging circuits, and so on. Alternatively, the VR headset may receive power from an external source such as, for example, from the computing device with which it is operating.

Dynamic windowing circuit 160 a display driver 174 to drive display 180 in the VR headset. Display 180 may include one or more display devices positioned in front of the wearer's eyes. For example, VR headset 124 can include two displays (e.g., one for each eye) for stereoscopic vision.

The dynamic windowing functions of the VR headset may be performed using various components of the VR headset as described above. For example, processor 176 may receive information from the sensor package to determine head position and movement as well as peripheral position, location and orientation to determine whether and to what extent an object window should be displayed on display 180 of the headset. In order to reduce the need for additional parts, the dynamic windowing circuit can be implemented using the aforementioned and other existing components of the VR headset. In other words, one or more of the components of dynamic windowing circuit 160 can be provided as dedicated components to the dynamic windowing circuit, or they can be components also used for other VR headset functions. For example, accelerometer 162, position sensor 164, image sensor 166, speakers 170 processor 176, memory 178, display driver 174, display 180, and other components may be components otherwise included with the VR headset and used to also perform traditional VR headset functions.

In other embodiments, a dynamic windowing circuit 160 may be implemented with some or all of its components separate from those used for other functions of the VR headset, and such components may be included within the VR headset or external to the VR headset. For example, in some embodiments, some or all of the processing and storage used for the dynamic windowing capability may be performed by processing devices in the associated computing system, in the cloud, or elsewhere.

Figure 3:
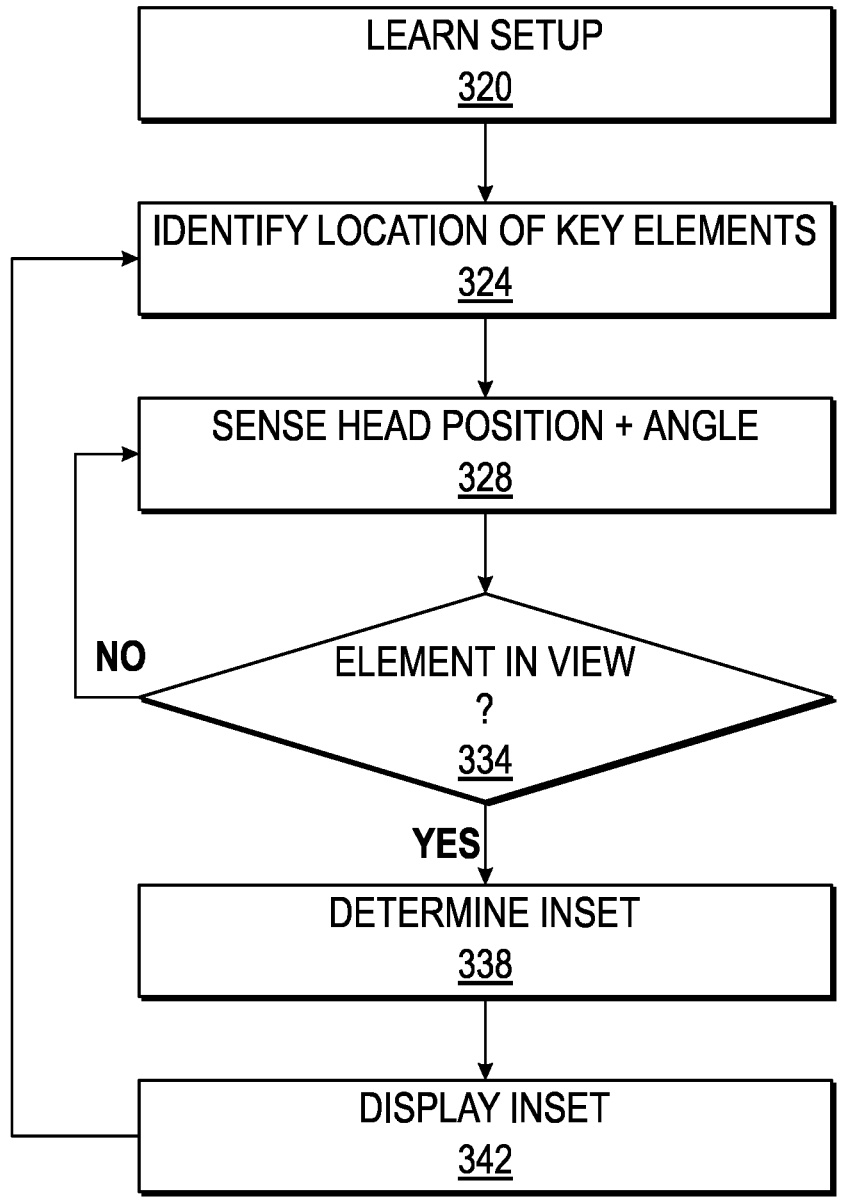
FIG. 3 illustrates an example process for dynamic windowing in accordance with various embodiments.

FIG. 3 illustrates an example process for dynamic windowing in accordance with various embodiments. Referring now to FIG. 3, at operation 320 the system learns the set-up of the computing environment. For example, information about the peripheral and other objects used in the particular computing environment can be entered or obtained, and stored in memory such that they can be accessed by the dynamic windowing capabilities of the VR headset (e.g., dynamic windowing circuit 160). Consider an example in which the computing environment is arranged as shown in FIG. 1, with keyboard 126, mouse 128, notepad 132 and computer 130. Information about these objects can be detected by or provided to the dynamic windowing circuit. For example, information such as device make and model, version information, part number, SKU or other identifying information can be provided or detected such that the dynamic windowing circuit knows or can determine the shape and dimensions of these objects. In some embodiments, this identifying information can be used to access a database containing dimension, shape and other relevant information.

For example, the identification information of the objects can be entered by a user. As another example, the objects can include RFID tags, transmitters, QR codes or other optical tags, or other mechanisms to transmit object information (e.g., identification, dimensions, shape, etc.) to the dynamic windowing circuit, whether directly or through the computing system. As yet another example, cameras, such as those on VR headset 124, can capture an image of these devices and, based on their position, orientation, and the angle of the headset, their dimensions and geometry can be calculated based on the received images.

At operation 324, the system determines the location of the objects in the workspace. In some embodiments, the positions of the objects are entered by the user. In other embodiments the system is configured to detect their positions using, for example, the cameras or other sensors. A learn mode may be used in which the dynamic windowing system learns the appearance of the objects such that it can detect their location in the workspace. Once the objects are learned, the system can detect their position when they come into view of the cameras or other sensors. Using cameras or other sensors enables continuous or real time monitoring and detection of device positions. This can be useful in a changing environment such as where the user may move the objects within the work area, or when a new user may use the system with different object placement.

At operation 328, while the headset is in operation the dynamic windowing system senses the head orientation, such as head position and angle. Information from the sensors can be used to determine the position, angle and movement of the user's head. For example, sensor information can be captured and can be sent to processor 176 to detect movement and position of the user's head as they tilt or twist their head or otherwise move around in the environment (e.g., head position, change in position, head orientation, change in orientation, and so on).

At operation 334, the dynamic windowing system determines whether one or more peripherals his in view of the headset. In one embodiment, this can be determined by comparing the location of the peripherals as determined in operation 324 and the user's head position and angle as determined in operation 328. In other embodiments, images obtained from image sensors (e.g., image sensor 166) are analyzed to determine whether one or more objects, or portion thereof, are in view of the cameras in the VR headset (e.g., image sensor 160). This can be accomplished using image analysis software (e.g., via processor 176) that can recognize the various objects. For ease of recognition, images of the objects can be captured and learned during set up.

If no object is in view, the system continues to utilize information from the sensor package (e.g., by comparing head position and angle to object position, or by image analysis to detect objects in view) to determine whether an object comes into view. As noted above, the detection and determination can be happening continuously such that the object window can be popped up in real time during operation as appropriate.

At operation 338, the dynamic windowing system determines the object-window position. And, at operation 342, the object window is displayed at the determined position. For example, the object-window position may be determined based on the actual position of the object in the field of view of the cameras of the virtual reality headset. For example, if the user is looking down slightly, the dynamic window appears toward the bottom of the display in the headset. As the user tilts their head farther down, the dynamic window may move farther up the display. As the user tilts their head up, the dynamic window may move down on the display. Similarly, as of the user tilts their head to the right, the dynamic window may shift to the left on the display and as the user tilts their head to the left, the dynamic window may shift to the right on the display. Thus, the object-window position can also be dynamic in that it moves within the display as the user twists or tilts his or her head relative to the device. In either case, the system may be configured such that the object window disappears from the display if the user tilts their head far enough such that the peripheral is no longer in view of the user.

In other embodiments, the object-window position can be set or otherwise controlled based on user input. For example, dynamic window positions for various peripherals can be programmed so that the peripheral shows up in those positions each time. The position can be updated from time to time based on user input. Indeed, various dynamic windowing operations can be controlled, enabled, disabled, or otherwise manipulated by the user based on menu settings, hotkeys or other keystrokes, mouse or other peripheral input, gesture controls and so on. This can allow the user to, for example, turn on or off, resize, reposition or otherwise manipulate dynamic windows using such controls. In the example of gesture controls, a wave in one direction may cause the system to close an object window and a wave in the opposite direction may reopen the object window. Similarly, pinch and drag operations may allow the user to quickly and easily resize and reposition dynamic windows on the display.

The size and shape of the object window can be configured to match the outline of the peripheral being displayed in the object window. Thus, the system can avoid having, or reduce or minimize, the amount of unnecessary dead space around the outside of the peripheral, and therefore avoid taking up valuable VR display area. Similarly, the system can avoid or minimize cutting off portions of the peripheral by an object window that might otherwise be too small.

Figure 4A:
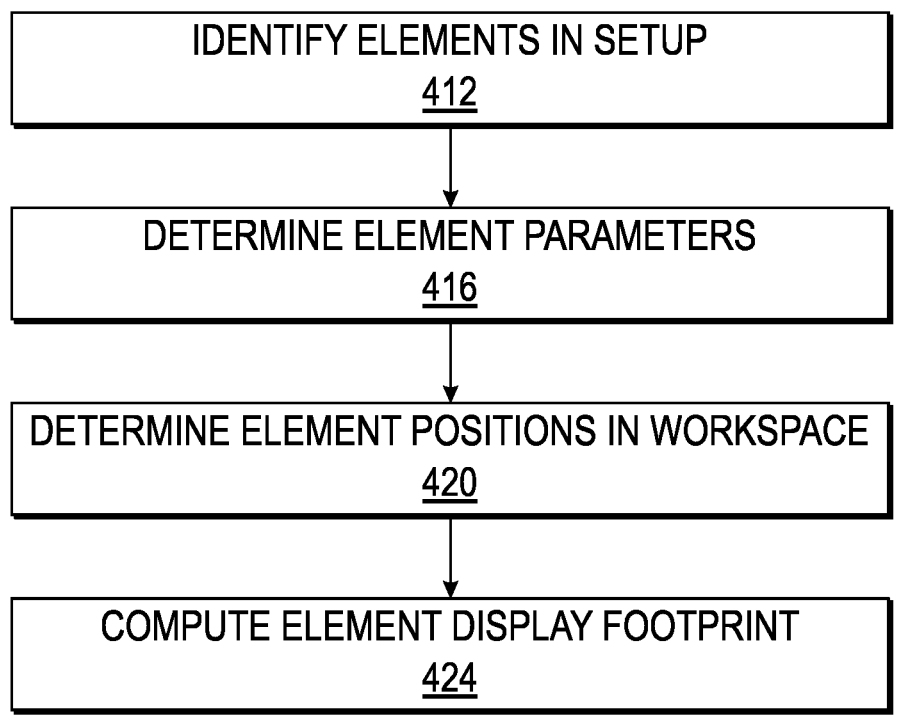
FIG. 4A illustrates an example for setting up peripherals in the workspace in accordance with various embodiments.

FIG. 4 illustrates an example for setting up objects in the workspace in accordance with various embodiments. Referring now to FIG. 4, at operation 412 objects to be viewed in object windows may be identified during set up. In applications where the objects include transmitters, RFID tags, QR codes or other passive or active optical tags, or other means to enable electronic or automatic identification, the objects can be detected and automatically identified by the system. Where QR codes, visible or IR LEDs, reflectors, or other optical detection means are used, the user may scan or sweep the work space with the VR headset such that the cameras of the VR headset can "see" each peripheral in the workspace and detect its codes. Detected codes can be read by the processor to determine identification of the associated peripherals.

Because many objects connect with their associated computing systems via wired or wireless channels (e.g., USB cables, Bluetooth, Wi-Fi, etc.) the objects can identify themselves to the computing system. This may normally be done, for example, when the appropriate drivers are identified and installed for the objects. An application on the computing device may scan for objects attached to the device that may be subject to dynamic windowing and send an identification of these objects to the dynamic windowing system. In this way, relevant objects can be identified automatically by the computing system. The user may be given the opportunity to edit the automatically generated list such as, for example, by deleting items from the list, adding items to the list or editing the particular identifications for items on the list.

As yet another example, cameras on the VR headset can be used to capture images of the objects in the workspace. These images can be used to identify the objects based on comparisons of the images with known devices. In some instances, the system may be able to determine manufacturer and model number based on image comparisons. In other situations, however, the system may only be able to determine the type of object based on detected characteristics (e.g., is the object a keyboard, mouse, joystick, etc.).

Figure 4B:
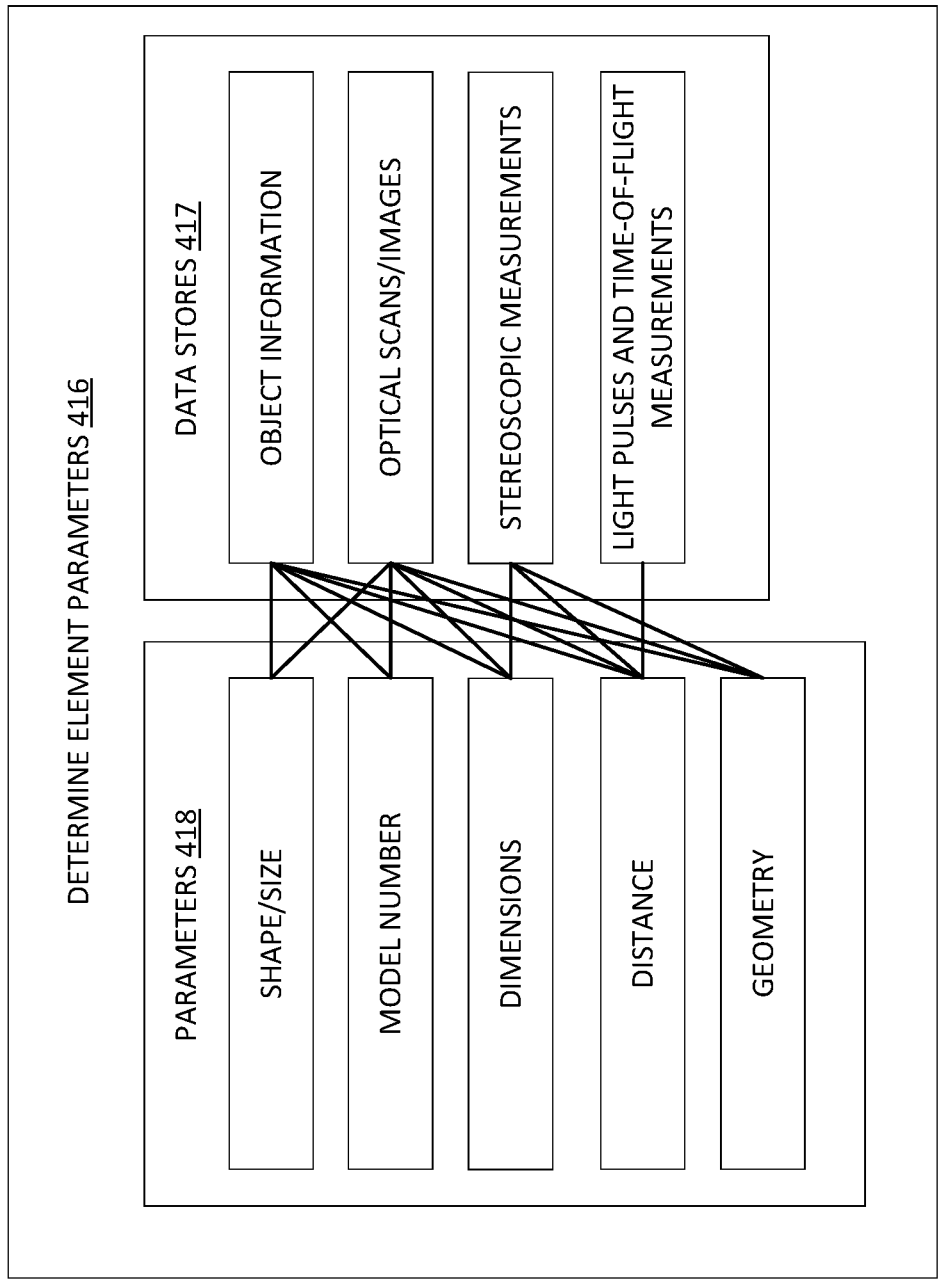
FIG. 4B further illustrates the elements of FIG. 4A.

At operation 416, the system determines parameters of the object or objects identified. For example, the windowing system may look up information about a particular object so that it can determine its shape and size for windowing. The lookup can be performed based on the model number identified at operation 412. As another example, the system may perform an optical scan of the objects to capture their parameters via image processing. To accomplish this, the user, wearing the VR headset, may "look" at each object and allow the system to capture an image or images of the object. Image analysis software can determine the geometric shape of the object, including its outlines. Dimensions of the object can be determined based on a measured distance between the image sensors and the object. This distance may be measured, for example, electronically using stereoscopic measurement or using light pulses (visible or invisible) and time-of-flight measurement. Other distance measurement techniques may be used. FIG. 4B illustrates the data stores and parameters that can be determined at operation 416. As described above, data stores 417 can comprise object information, optical scans/images, stereoscopic measurements, and light pulses and time-of-flight measurements. Data can be retrieved from these data stores to determine parameters 418 such as shape/size, model number, dimensions, distance, and geometry.

At operation 420, the system determines the positions of the objects in the workspace. This operation might not be necessary for embodiments that use image sensing to determine whether the user is "looking" at the object. However, embodiments that don't use this image sensing benefit from knowing the location of the object such that the cameras can be engaged and the object window displayed when the user looks at the object. Positions of objects can be determined by a number of different techniques. For example, the user may enter each object's position into the computing system and that information provided to the dynamic windowing system. Objects may be equipped with optical markers (tags, bar codes, QR codes, etc.) or transmitters (RF, visible light, infrared, RFID, etc.) that can be used to triangulate the location of the objects.

At operation 424, the dynamic windowing system determines the display footprint for the objects in the system. For example, the system may use the information determined at operation 416 to define the object footprint and thus, the object window parameters. A keyboard, for example, would generally be roughly rectangular in shape and, depending on the keyboard design may have other geometric features that drive the shape of the object window. As another example, a mouse may have an ovate or teardrop shape and its corresponding window defined accordingly.

During operation, the system may dynamically change the size of the windows based on where the user is looking (see, e.g., FIG. 6), based on user operations or based on changing object shapes. For example, some objects may change size/shape based on use. An example is an aircraft simulation controller, and the system can use image processing to distinguish the object (and the user's hand(s) operating the object) from the background and change the window's size/shape to conform to the object as it is manipulated. In this example, as the user moves the yoke or throttle sticks of the object, the window can change shape to keep the object (and perhaps the user's hand) in view. As another example, if a user is writing on a pad, the system can recognize where on the pad the user is writing based on hand position and changes in the image and resize the window to focus on where the user is writing. In other words, the windowing around the pen can be dynamic and move and its size can be tailored to show what is needed.

In yet further embodiments, the windowing can be created, shaped and positioned based on the user's hand positions. For example, when a user moves their hands over the object, this can be sensed by image processing and the object window engaged. The object window can be sized to allow the user to see their hand or hands, and maybe some area around their hands. When the user moves their hand or hands across the object, the object window can follow the hands so that the user can see what they are about to touch. To avoid unwanted triggering of the dynamic window, the system can be configured to be activated/deactivated based on gesture controls.

The system can also be provided with an override control to avoid showing unwanted dynamic windows for one or more objects. For example, in the case of a computer display 130 positioned directly in front of the user, the presence of this object may trigger an object window for that display whenever the user is looking in the forward, or slightly forward, direction, even if the user does not want to see that object in the VR headset display. This may interfere with the user's view of the virtual world. Accordingly, the system can be configured to allow the user to disable dynamic windowing for one or more objects in the environment, or to provide selective dynamic windowing for certain objects. These can be programmed or otherwise set up in advance as user preferences, or can be controlled by user input during operation of the system. In some embodiments, machine learning or artificial intelligence can be used to determine which objects should not be displayed, or when to display certain objects, based on user data. The user data for this learning may be based solely on the particular user of the system, or may be based on the activities of a small number of users. In further applications, the user data can include crowd-sourced data from numerous users operating similar systems.

Figure 5:
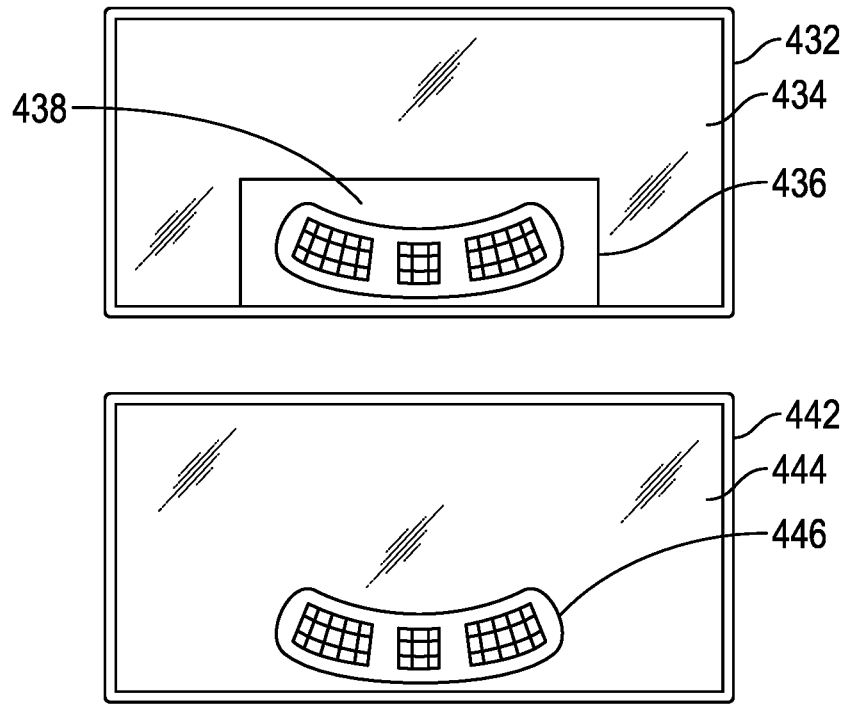
FIG. 5 illustrates an example comparison and contrast between conventional displays with peripheral windows and a display with dynamic windowing in accordance with various embodiments.

FIG. 5 illustrates an example comparison and contrast between conventional displays with object windows and a display with dynamic windowing in accordance with various embodiments. Display 432 is a conventional display with standard windowing. Display 442 is an example of a display in accordance with the embodiments disclosed herein, including dynamic object windowing.

In first with regard to display 432, this example illustrates that the display includes an active display portion 434 and an object window 436 overlaid on top of or included within active display 434. As this illustrates, object window 436 is of a generic rectangular shape large enough to accommodate images of the object captured therein. In this example, the object is an ergonomic keyboard having a curved shape. As seen, there is wasted space 438 around the object because the window is not configured to conform to the geometry of the keyboard. This results in the window consuming unnecessary portions of the active display 434 and also presents an unfinished look.

In contrast, with display 442, object window 446 is of a size and shape to conform to the geometry of the ergonomic keyboard displayed therein. There is no dead space in this example and object window 446 consumes just about the minimum amount of area of active display 444 as is possible. This also presents much more finished and bespoke look to the display in general.

Figure 6:
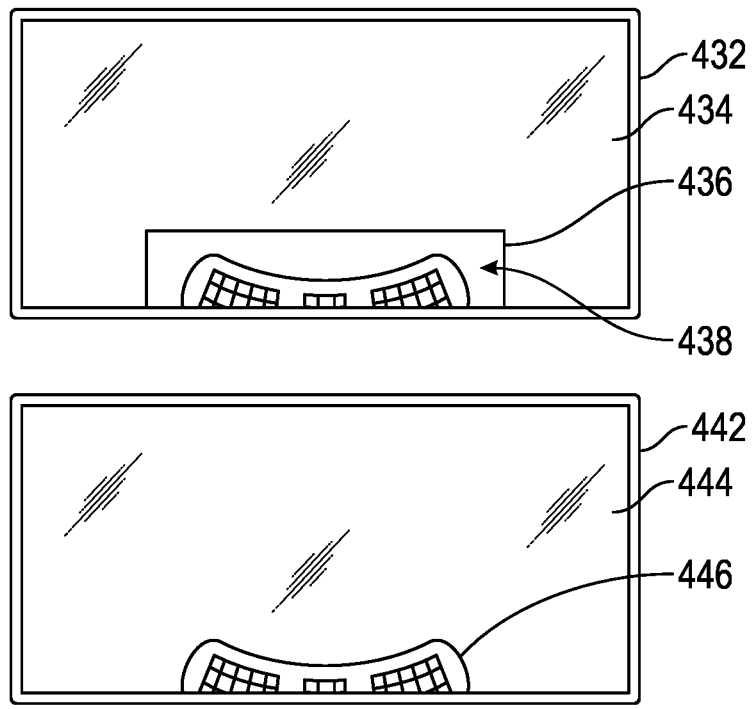
FIG. 6 illustrates an example comparison and contrast between displays with peripheral windows that do not include dynamic positioning and a display with dynamic windowing in accordance with various embodiments.

FIG. 6 illustrates an example comparison and contrast between displays with object windows that do not include dynamic positioning and a display with dynamic windowing in accordance with various embodiments. In the example of FIG. 6, with the conventional display 432 if the user tilts their head up, the object disappears from view but window 436 remains the same size and shape. This has the effect of increasing the dead space 438. In contrast, with embodiments of the technology disclosed herein, when the user tilts their head up, object window 446 begins to slide down display 442 leaving more of active display 444 visible. As seen in this example, only the top portion of the keyboard is visible and only the top portion of the object window 446 is visible. Object window 446 remains tailored to the dimensions of the object, even as it slides down the display and ultimately off screen.

Figure 7:
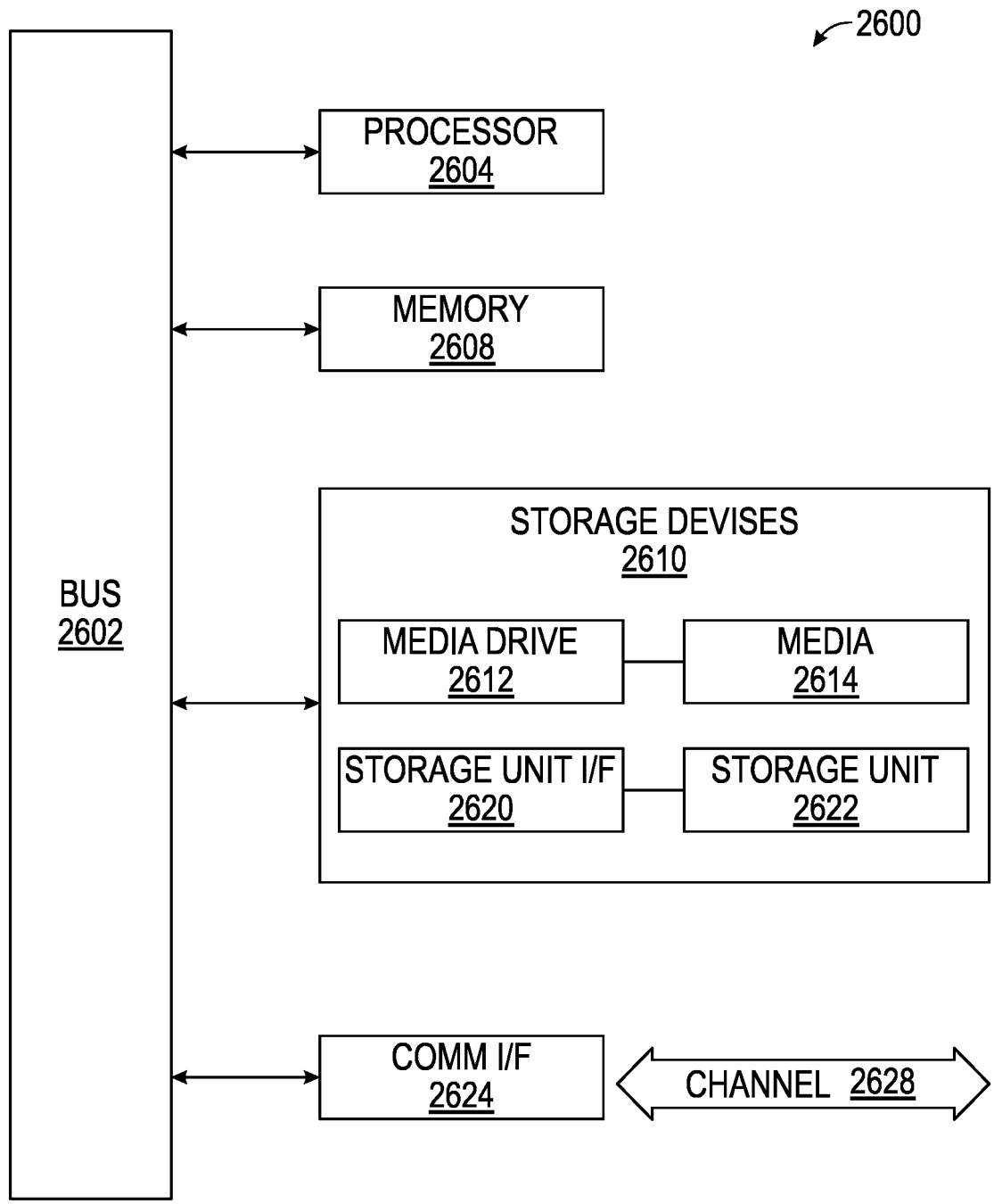
FIG. 7 illustrates an example computing module that may be used in implementing various features of embodiments of the disclosed technology.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 7. Various embodiments are described in terms of this example—computing system 2600. After reading this description, it will become apparent to a person skilled in the relevant art how to implement the technology using other computing systems or architectures.

Referring now to FIG. 7, computing system 2600 may represent, for example, computing or processing capabilities found within desktop, laptop and notebook computers; hand-held computing devices (smart phones, cell phones, palmtops, tablets, etc.); mainframes, supercomputers, workstations or servers; or any other type of special-purpose or general-purpose computing devices as may be desirable or appropriate for a given application or environment. Computing system 2600 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 2600 might include, for example, one or more processors, controllers, control modules, or other processing devices, such as a processor 2604. Processor 2604 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 2604 is connected to a bus 2602, although any communication medium can be used to facilitate interaction with other components of computing system 2600 or to communicate externally.

Computing system 2600 might also include one or more memory modules, simply referred to herein as main memory 2608. For example, in some embodiments random access memory (RAM) or other dynamic memory, might be used for storing information and instructions to be executed by processor 2604. Main memory 2608 might also be used for storing temporary variables or other intermediate information during execution of instructions to be executed by processor 2604. Computing system 2600 might likewise include a read only memory ("ROM") or other static storage device coupled to bus 2602 for storing static information and instructions for processor 2604.

The computing system 2600 might also include one or more various forms of information storage mechanism 2610, which might include, for example, a media drive 2612 and a storage unit interface 2620. The media drive 2612 might include a drive or other mechanism to support fixed or removable storage media 2614. For example, a hard disk drive, a floppy disk drive, a magnetic tape drive, an optical disk drive, a CD or DVD drive (R or RW), a flash drive, or other removable or fixed media drive might be provided. Accordingly, storage media 2614 might include, for example, a hard disk, a floppy disk, magnetic tape, cartridge, optical disk, a CD or DVD, or other fixed or removable medium that is read by, written to or accessed by media drive 2612. As these examples illustrate, the storage media 2614 can include a computer usable storage medium having stored therein computer software or data.

In alternative embodiments, information storage mechanism 2610 might include other similar instrumentalities for allowing computer programs or other instructions or data to be loaded into computing system 2600. Such instrumentalities might include, for example, a fixed or removable storage unit 2622 and an interface 2620. Examples of such storage units 2622 and interfaces 2620 can include a program cartridge and cartridge interface, a removable memory (for example, a flash memory or other removable memory module) and memory slot, a flash drive and associated slot (for example, a USB drive), a PCMCIA slot and card, and other fixed or removable storage units 2622 and interfaces 2620 that allow software and data to be transferred from the storage unit 2622 to computing system 2600.

Computing system 2600 might also include a communications interface 2624. Communications interface 2624 might be used to allow software and data to be transferred between computing system 2600 and external devices. Examples of communications interface 2624 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 2624 might typically be carried on signals, which can be electronic, electromagnetic (which includes optical) or other signals capable of being exchanged by a given communications interface 2624. These signals might be provided to communications interface 2624 via a channel 2628. This channel 2628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 2608, storage unit 2622, media 2614, and channel 2628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 2600 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for headset windowing, comprising:
   determining a location of one or more objects in a virtual workspace;
   determining, based on information received from a sensor, when a user wearing a VR headset moves their head to bring an object of the one or more objects in the virtual workspace into view of the VR headset;
   determining an object-window position for the object of the one or more objects in the virtual workspace;
   displaying a first window on a display of the VR headset based on the object-window position; and
   dynamically updating the first window as the user moves the user's head.

2. The method of claim 1, wherein, when the user looks down, the first window appears toward a bottom of the display of the VR headset.

3. The method of claim 1, wherein moving the user's head to the right causes the first window to shift to the left of the display of the VR headset.

4. The method of claim 1, wherein moving the user's head to the left causes the first window to shift to the right of the display of the VR headset.

5. The method of claim 1, wherein the first window disappears from the display when the user's head moves far enough such that the object of the one or more objects is no longer in view of the user.

6. The method of claim 1, wherein a size and shape of the first window is configured to match an outline of the object of the one or more objects.

7. The method of claim 1, wherein the first window can be manipulated by menu settings, hotkeys or other keystrokes, mouse or other peripheral input, or gesture controls.

8. The method of claim 7, wherein the gesture controls comprise waving the user's hand in a first direction to close the first window and waving the user's hand in a second direction to reopen the first window.

9. The method of claim 7, wherein the gesture controls comprise pinch and drag operations to resize and reposition the first window.

10. The method of claim 1, wherein the first window is displayed at the object-window position.

11. The method of claim 1, further comprising determining the user's head orientation and adjusting the first window based on the head orientation.

12. A headset windowing system, comprising:
    a processor; and
    a memory coupled to the processor to store instructions, which when executed by the processor, cause the processor to perform operations, the operations comprising:
       determine a location of one or more objects in a virtual workspace;
       determine, based on information received from a sensor, when a user wearing a VR headset moves their head to bring an object of the one or more objects in the virtual workspace into view of the VR headset;
       determine an object-window position for the object of the one or more objects in the virtual workspace;
       display a first window on a display of the VR headset at the object-window position; and
       dynamically update the first window as the user moves the user's head.

13. The headset windowing system of claim 12, wherein, when the user is looking down, the first window appears toward a bottom of the display of the VR headset.

14. The headset windowing system of claim 12, wherein moving the user's head to the right causes the first window to shift to the left of the display of the VR headset.

15. The headset windowing system of claim 12, wherein moving the user's head to the left causes the first window to shift to the right of the display of the VR headset.

16. The headset windowing system of claim 12, wherein the first window disappears from the display when the user moves their head far enough such that the object of the one or more objects is no longer in view of the user.

17. The headset windowing system of claim 12, wherein a size and shape of the first window is configured to match an outline of the object of the one or more objects.

18. The headset windowing system of claim 12, wherein the first window can be manipulated by menu settings, hotkeys or other keystrokes, mouse or other peripheral input, or gesture controls.

19. The headset windowing system of claim 18, wherein the gesture controls comprise waving the user's hand in a first direction to close the first window and waving the user's hand in a second direction to reopen the first window.

20. The headset windowing system of claim 18, wherein the gesture controls comprise pinch and drag operations to resize and reposition the first window.

* * * * *